(12) United States Patent
Lu et al.

(10) Patent No.: US 11,750,735 B2
(45) Date of Patent: Sep. 5, 2023

(54) CHANGING A USER INTERFACE BASED ON AGGREGATED DEVICE CAPABILITIES

(71) Applicant: INTERNATIONAL BUSINESS MACHINES CORPORATION, Armonk, NY (US)

(72) Inventors: Fang Lu, Billerica, MA (US); Martin G. Keen, Cary, NC (US); Jeremy R. Fox, Georgetown, TX (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 83 days.

(21) Appl. No.: 17/452,589

(22) Filed: Oct. 28, 2021

(65) Prior Publication Data
US 2023/0138036 A1 May 4, 2023

(51) Int. Cl.
*H04M 1/72463* (2021.01)
*H04M 1/72412* (2021.01)
(Continued)

(52) U.S. Cl.
CPC .... *H04M 1/724631* (2022.02); *H04L 67/306* (2013.01); *H04M 1/72454* (2021.01); *H04M 1/72457* (2021.01); *H04M 1/73* (2013.01)

(58) Field of Classification Search
CPC ......... H04M 1/72463; H04M 1/72454; H04M 1/72457; H04M 1/73; H04M 1/724631; H04M 1/72412; H04L 67/306
See application file for complete search history.

(56) References Cited

U.S. PATENT DOCUMENTS 7,779,409 B2 * 8/2010 Persson ..................... G06F 8/61
717/178
7,865,181 B1 * 1/2011 Macaluso ............ H05K 999/99
455/418

(Continued)

FOREIGN PATENT DOCUMENTS

WO    2016085878 A1    6/2016

OTHER PUBLICATIONS

Mell et al., "The NIST Definition of Cloud Computing", National Institute of Standards and Technology, Special Publication 800-145, Sep. 2011, 7 pages.

*Primary Examiner* — Farid Seyedvosoghi
(74) *Attorney, Agent, or Firm* — David Spalding

(57) ABSTRACT

A computer-implemented method, a computer system and a computer program product dynamically change the user interface on a mobile device. The method includes displaying a user interface on a first device. The user interface includes a set of graphical controls corresponding to a plurality of functions of the first device. The method also includes connecting to the second device in response to a determination that the device includes a capability not included in the plurality of functions of the first device. The method further includes determining an aggregate function set for the first and second devices that includes the plurality of functions of the first device and is updated to include the capability of the second device. Finally, the method includes modifying the user interface of the first device based on the aggregate function set by adding a graphical control corresponding to the capability of the second device.

20 Claims, 5 Drawing Sheets

(51) Int. Cl.
*H04M 1/72454* (2021.01)
*H04M 1/73* (2006.01)
*H04M 1/72457* (2021.01)
*H04L 67/306* (2022.01)

(56) References Cited

U.S. PATENT DOCUMENTS

| | | |
|---|---|---|
| 9,158,518 B2 | 10/2015 | Brown |
| 9,841,968 B1 | 12/2017 | Riedl |
| 9,880,695 B2 | 1/2018 | Thomason |
| 10,715,602 B2 | 7/2020 | Kim |
| 10,757,243 B2 | 8/2020 | Dagit, III |
| 2005/0014531 A1* | 1/2005 | Findikli ............ H04M 1/72409 455/557 |
| 2013/0185380 A1* | 7/2013 | Anderson ............ H04L 67/148 709/217 |
| 2015/0087288 A1* | 3/2015 | Dharawat ............ H04W 4/50 455/419 |
| 2019/0052721 A1* | 2/2019 | Romano ............ H04L 67/303 |
| 2019/0297478 A1 | 9/2019 | Langlois |
| 2021/0026614 A1* | 1/2021 | Manoharan ............ G06F 9/455 |

\* cited by examiner

CHANGING A USER INTERFACE BASED ON AGGREGATED DEVICE CAPABILITIES

BACKGROUND

Embodiments relate generally to the field of computing, and more particularly to methods for dynamically changing a user interface for a mobile device based on aggregated capabilities of related mobile devices.

Smart mobile devices are electronic devices, such as smartphones or tablets, that may be capable of connecting to the internet or communicating with other devices across a network. These smart mobile devices may be capable of downloading and installing applications across a network for use on the device or for interacting with other devices. In the current ecosystem, a user may have multiple devices and may connect their device to surrounding devices. Since different devices may have different capabilities, those capabilities may be detected and collected into an aggregate functionality level for the user, which may facilitate advanced computing services for the user through the smart mobile device.

SUMMARY

An embodiment is directed to a computer-implemented method for dynamically changing a user interface on a mobile device. The method may include displaying a user interface on a first device. The user interface may include a set of graphical controls corresponding to a plurality of functions of the first device. The method may also include connecting to the second device in response to a determination that a second device includes a capability that is not included in the plurality of functions of the first device. The method may further include determining an aggregate function set for the first and second devices. The aggregate function set may include the plurality of functions of the first device and may be updated to include the capability of the second device. Lastly, the method may include modifying the user interface of the first device based on the aggregate function set by adding a graphical control corresponding to the capability of the second device.

In another embodiment, the method may include updating the aggregate function set by removing the capability of the second device from the aggregate function set in response to the second device disconnecting from the first device. In this embodiment, the method may also include disabling the graphical control corresponding to the capability of the second device.

In a further embodiment, the method may include receiving a determination from an owner of the second device whether the capability of the second device is allowed. In this embodiment, the method may also include updating the aggregate function set to include the capability of the second device in response to the capability being allowed.

In yet another embodiment, the aggregate function set may include a combined level of computing resources of the first and second devices, where the computing resources may be memory, processor speed or available storage space.

In still another embodiment, connecting to the second device may include obtaining a user profile. The user profile may include a list of devices allowed to connect to the first device. In this embodiment, connecting to the second device may also include connecting to the second device in response to the list of devices including the second device.

In another embodiment, connecting to the second device may include determining a location of the first device and updating the list of devices allowed to connect to the first device based on the location.

In a further embodiment, connecting to the second device may include determining a level of battery power remaining in the second device and connecting to the second device in response to the level being above a threshold.

In addition to a computer-implemented method, additional embodiments are directed to a system and a computer program product for dynamically changing a user interface on a mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
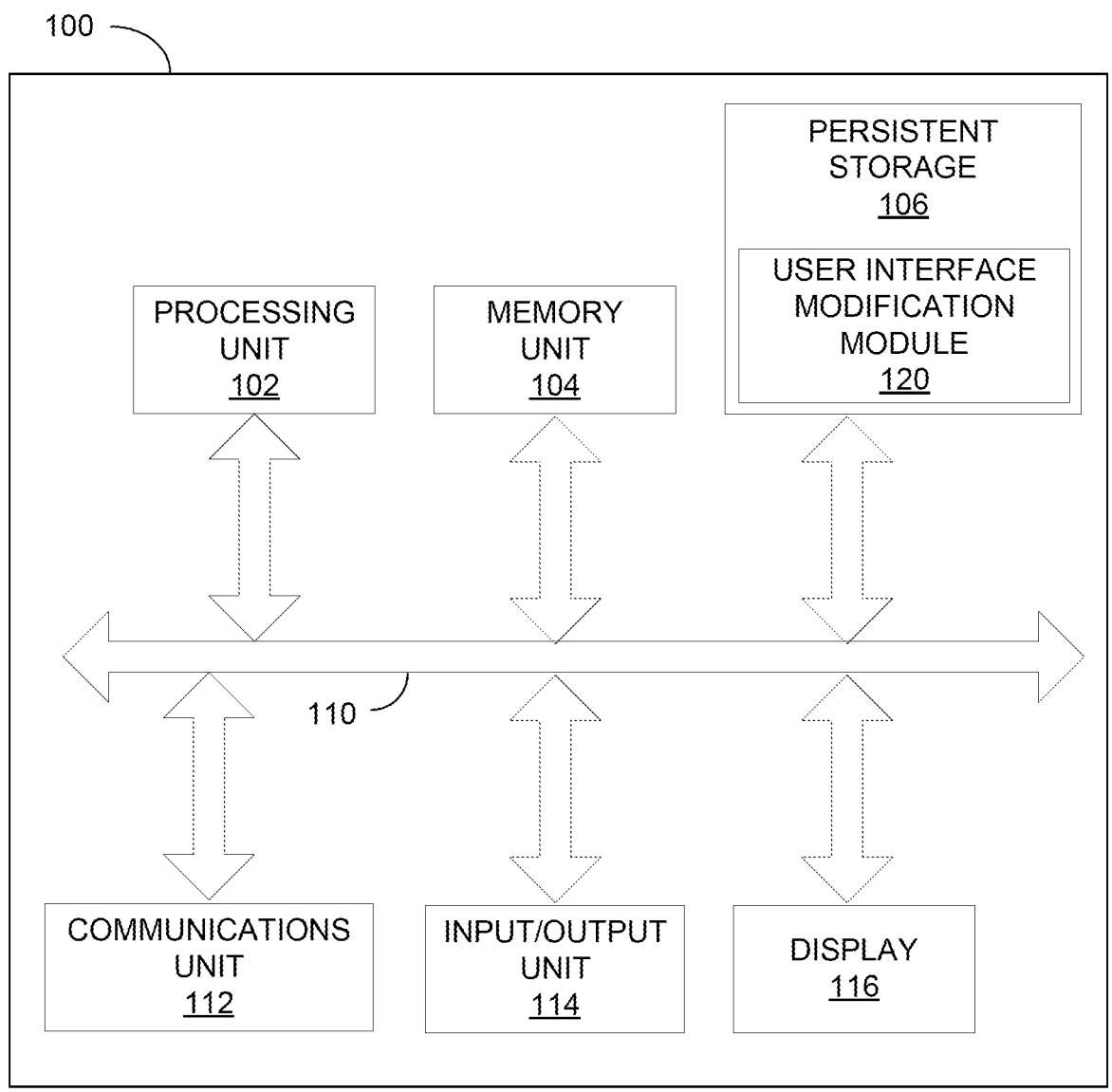
FIG. 1 is a block diagram of an example computer system in which various embodiments may be implemented.

The world has seen a proliferation of mobile devices in the marketplace, meaning that one user may have multiple devices connected to their physical person or an account in their name. As an example, a single user may have a smartphone that may make voice calls or take pictures with an onboard camera but may also have a smart watch that may monitor various vital signs of the user such as blood pressure or heart rate. A user may also have a tablet computer that also includes the capability to capture images but from a different angle that may be desired at a given time. Within a user's home, many further devices may be deployed to connect to the Internet of Things (IoT) ecosystem to monitor the environment for comfort, e.g., heating or cooling, or security, e.g., locking or unlocking entries and exits to permit or deny access or video monitoring of valuables. In many cases, these devices may have individual user interfaces to control and monitor the underlying device and this may lead to a myriad of apps on a primary mobile device, such as a smartphone, that may be used for these functions. In addition to the clutter of many separate user interfaces, the logistics of managing a collection of devices separately may make it onerous to perform certain tasks that may require more than one or two of these devices. At the same time, many tasks that a user may wish to perform may be limited to a single device such as a smartphone or tablet.

In an edge computing environment, where greater computing power may be required in locations where a primary mobile device may be used, aggregating multiple devices may be useful. The devices available to a user at any given time may be quite diverse in both their capabilities and processing power and all of these devices may share one important feature: connecting to a public or private network such as the Internet. This means that a primary mobile device may be connected (paired) to or disconnected (unpaired) from surrounding devices, i.e., devices in physical proximity to the primary mobile device, or to the IoT ecosystem as whole, which may be represented in a home or office by the network of devices that communicate with one another in the physical environment. Because of the diversity of capabilities between devices, as the primary mobile device pairs with other devices and the primary mobile device becomes aware of the capabilities of these devices, an aggregate functionality level of the combination may be increased, thereby increasing the scope of tasks that a user may perform with the primary mobile device. In addition to functional capability, additional computing resources may be available to the primary mobile device, which may also increase the scope of tasks available to the user.

In addition, the design of user interfaces (UI), i.e., the physical means that allow users to interact with monitors, screens or mobile devices, for both the mobile device and individual apps loaded on the device is generally aimed towards easy, enjoyable and effective interactions between users and the device or app. In fact, the primary goal of said design is to provide the best interaction possible for all devices owned by an individual, business, or firm. However, if a primary mobile device is paired with additional devices that provide additional resources or capabilities, thus increasing an aggregate functionality level, then the user may also perform additional computation and execute additional functions. As a result, the user interface of the primary mobile device may not be able to access these additional resources or capabilities and, therefore, the user interface may need to be changed to incorporate these additional resources or capabilities.

Therefore, it may be advantageous to provide a method and system for dynamically changing the user interface of the primary mobile device based on the changes in device resources or capabilities. Such a method may dynamically update the user interface of the primary mobile device based on the aggregated capabilities acquired by pairing the primary mobile device with other devices that may be determined to be needed to perform a specific task. In such an instance, the app icons on the main screen of the primary mobile device may be positioned to effectively use the additional resources or capabilities as needed, as well as any text or graphics used in a particular screen for an app that uses the additional resources or capabilities of the paired devices.

In addition, such a method may remove functionality from a primary mobile device user interface if the primary mobile device is unpaired with other devices. In such an instance, one or more capabilities or functionalities may be shown as disabled or removed completely from the primary mobile device user interface. In the case of disabled functionality, the user may attempt to enable certain capabilities, in which case the primary mobile device may search for appropriate devices in the surrounding area which may be used to enable the desired capabilities. Unpairing of devices, and therefore changes to the user interface of the primary mobile device, may also be based on change in relative position of the user with respect to the surrounding devices, e.g., a user is walking in a city and moves further away from a fixed device such as a camera on a light pole.

It should be noted that such a method may be used in a multi-user environment, meaning that one user's primary mobile device may typically be paired with devices that belong to the same user, e.g., a smartphone being paired with a smart watch, but this is not required. A user may form a relationship with other users, which may increase the pool of available devices in the surrounding area. Such a relationship, and thus pairing of mobile devices, requires the informed consent of all people whose devices may be used in the aggregate resources or capabilities, and thus the user interface of the primary mobile device. Such informed consent may be obtained in real time or through a prior waiver or other process that informs a subject that their mobile device, and thus potentially sensitive information on said device, may be at least partially controlled by another mobile device and data may be exchanged between the user's device and another user's primary mobile device. In addition, permission may be limited by the user to specific resources or capabilities of the affected device, e.g., power transfer is not allowed, storage memory is not allowed, but processing memory is allowed.

Referring now to FIG. 1, there is shown a block diagram illustrating a computer system 100 which may be embedded in the primary mobile device 202 depicted in FIG. 2 in accordance with an embodiment. Examples of the primary mobile device 202 include: a mobile phone, smart phone, tablet, laptop, a computing device embedded in a vehicle, a wearable computing device, virtual or augmented reality glasses or headset, and the like. It should be appreciated that FIG. 1 provides only an illustration of one implementation and does not imply any limitations with regard to the environments in which different embodiments may be implemented. Many modifications to the depicted environments may be made based on design and implementation requirements.

As shown, a computer system 100 includes a processor unit 102, a memory unit 104, a persistent storage 106, a communications unit 112, an input/output unit 114, a display 116, and a system bus 110. Computer programs such as the user interface modification module 120 may be stored in the persistent storage 106 until they are needed for execution, at which time the programs are brought into the memory unit 104 so that they can be directly accessed by the processor unit 102. The processor unit 102 selects a part of memory unit 104 to read and/or write by using an address that the processor unit 102 gives to memory unit 104 along with a request to read and/or write. Usually, the reading and interpretation of an encoded instruction at an address causes the processor unit 102 to fetch a subsequent instruction, either at a subsequent address or some other address. The processor unit 102, memory unit 104, persistent storage 106, communications unit 112, input/output unit 114, and display 116 interface with each other through the system bus 110.

Examples of computing systems, environments, and/or configurations that may be represented by the data processing system 100 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Each computing system 100 may also include a communications unit 112 such as TCP/IP adapter cards, wireless Wi-Fi interface cards, or 3G or 4G wireless interface cards or other wired or wireless communication links. Communication between mobile devices may be accomplished via a network and respective network adapters or communication units 112. In such an instance, the communication network may be any type of network configured to provide for data or any other type of electronic communication. For example, the network may include a local area network (LAN), a wide area network (WAN), a virtual private network (VPN), a mobile or cellular telephone network, the Internet, or any other electronic communication system. The network may use a communication protocol, such as the transmission control protocol (TCP), the user datagram protocol (UDP), the internet protocol (IP), the real-time transport protocol (RTP) the Hyper Text Transport Protocol (HTTP), or a combination thereof.

Figure 2A:
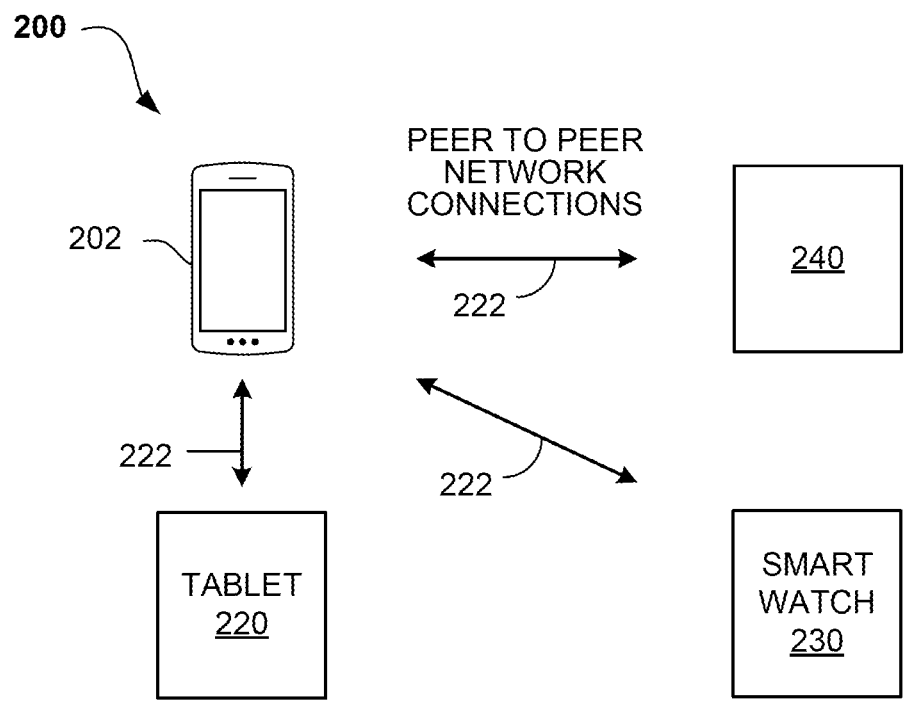
FIGS. 2A and 2B show an example of an environment where multiple devices pair with a primary mobile device and the user interface of the primary mobile device is modified according to an aggregate function set according to an embodiment.

It should be noted that in the example shown in FIG. 2A, connection, or pairing, may be accomplished directly between devices using a peer-to-peer wireless link technology such as Bluetooth and bypass the described network. In other words, two or more devices may detect the presence of the other devices and set up a direct connection between the devices, also learning the resources or capabilities of the other devices, without the need of a centralized network. This will be described in further detail with respect to FIG. 2A below.

Figure 2B:
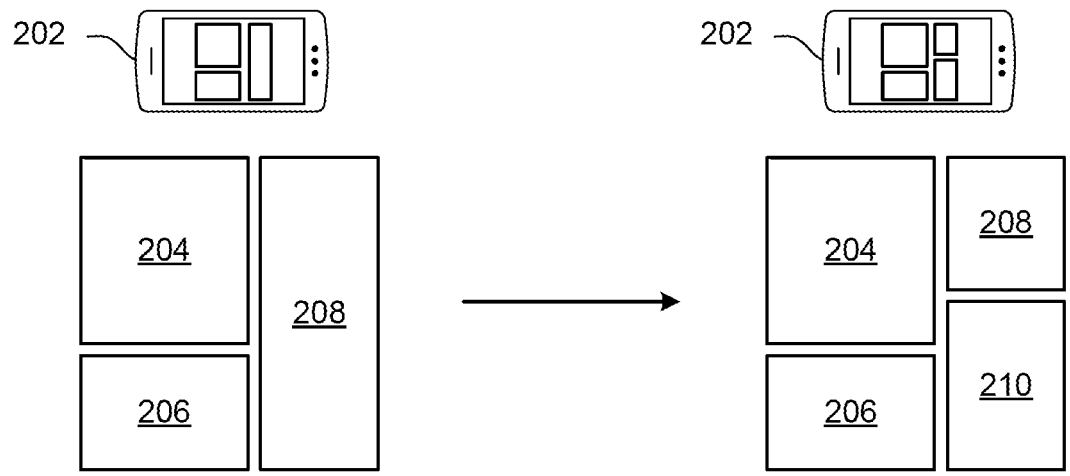

Referring to FIGS. 2A and 2B, an example 200 is shown in FIG. 2A of an environment where a primary mobile device 202 may be used to pair with other devices, e.g., tablet 220 and smart watch 230 and other devices 240 and complete a task that may require additional resources or capabilities that the primary mobile device 202 may not possess. The primary mobile device 202 is shown in FIG. 2A as a smartphone but it should be noted that the primary mobile device 202 may be any appropriate device with a screen, e.g., a laptop or tablet computing device, that may display a graphical user interface. One of ordinary skill in the art may recognize that although a tablet 220 and smart watch 230 are specifically identified as connecting to the primary mobile device 202, this is not required as any type of device that may be capable of connecting in the fashion described below may be paired with the primary mobile device 202. In addition, only three devices are shown in FIG. 2A for illustrative brevity but more or fewer devices may be connected to primary mobile device 202. Other device 240 is depicted in FIG. 2A and meant to convey that the specific type of device is not restricted, nor is the number of devices. In the embodiment of FIG. 2A in conjunction with FIG. 2B, a user interface may be displayed on the primary mobile device 202, e.g., the usual graphical display of the primary mobile device 202 or a screen that may be generated by one or more of the applications that may be loaded and running on the primary mobile device 202, of which an example is depicted in FIG. 2B, where windows 204, 206 and 208 may be displayed on the screen of primary mobile device 202 and modified as described below to include window 210.

As mentioned above with respect to communication between devices, FIG. 2A depicts peer-to-peer network connections 222 between devices that may allow the devices to be configured as a mesh (or ad-hoc) network. Mesh network refers to a networking topology where the nodes, e.g., the primary mobile device 202, the tablet 220, the smart watch 230 and other device 240, may connect directly and dynamically with no hierarchical structure in order to communicate with as many other nodes as possible and also to efficiently route data through the network. In this embodiment, the operations and processing that would otherwise be performed by a centralized network are instead performed by each of the devices that are connected to one another. The data that is gathered and processed by each of the devices may be automatically shared among the other devices so any relevant data may be processed by the primary mobile device 202 directly.

In the example 200, it may be determined that, in order to complete a certain task, the primary mobile device 202 may need additional resources or capabilities. For instance, an application on a user's tablet computer may need biometric data about the user that cannot be gathered directly by the tablet computer. Alternatively, an application on a mobile device may need camera input if it does not already possess such a capability or the application may need an angle from a different camera. In another example, an application on a mobile device may determine that the device is either too low on battery power or may not have enough computer processing power to complete a task and therefore, additional devices may be needed. It should be noted that it is not required for there to be a specific task or resource/capability requirements beforehand. In an embodiment, additional devices may be detected by the primary mobile device 202 and resources or capabilities of the additional devices may be determined, and the primary mobile device 202 may indicate that the added resources or capabilities are present, at which point certain tasks may be enabled that were not possible before the searching process.

Once it is determined that additional resources or capabilities are needed, the primary mobile device 202 may search for specific devices that have the desired functionality or, alternatively, may scan a defined area that is in physical proximity to the primary mobile device 202. The primary mobile device 202 may check the resources or capabilities of the devices that it finds against a database of devices that also stores the known functions of the specific device or it may query any device that it finds for information about its resources or capabilities on demand. As an example, if the search discovers wearable computing devices such as smart watches or smart glasses in the proximate area, the primary mobile device 202 may determine that the resources or capabilities of these devices may add to the resources or capabilities of the primary mobile device 202 and connect to the wearable computing devices. In this case, the combined resources or capabilities of the devices may be referred to as an "aggregate function set".

It should be noted that the consideration of whether a device that is found in the search has resources or capabilities appropriate to the task is not limited to specific functions such as a biometric sensor or a camera or microphone that may not be available on the primary mobile device 202. For instance, if a device does not belong to the specific user or to a pre-defined group of users that may exist, then the device may be ignored, or a request generated to get the informed consent of the device owner. Once access is allowed, factors such battery level maybe considered, e.g., if the device is extremely low on battery power, it may be bypassed in the search. Also, processing power may be considered, e.g., if it were determined that the device has a large amount of memory or processing speed, it may be more desirable for tasks that require heavier computation. Another factor that may be considered is safety, e.g., if a primary mobile device 202 were inside a moving automobile, there may be restrictions on whether pairing is allowed with a device connected with the driver.

As the primary mobile device 202 might discover new devices, e.g., tablet 220, smart watch 230 and other device 240, the primary mobile device 202 may also learn the resources or capabilities of the new devices. This may be accomplished by querying the device directly for its current state, including resources or capabilities or checks the device against a pre-defined list or resources or capabilities in a database or other information repository. If a resource or capability is determined to be new, i.e., not presently available within the aggregate function set, and needed, then the primary mobile device 202 may initiate pairing with the device in the peer-to-peer fashion described above. Once the device is connected to the primary mobile device 202, the user interface may be modified on the primary mobile device 202 as described with respect to FIG. 2B.

Referring to FIG. 2B, as mentioned above, an example user interface is depicted, where windows 204, 206 and 208 may be displayed on the screen of primary mobile device 202 and modified to include window 210. In the example of FIG. 2B, a new device has been detected by the primary mobile device 202 and pairing of the two devices has been completed and the primary mobile device 202 has determined the resources and capabilities that may not be present in the aggregate function set and may be added by the new device. In addition to updating the aggregate function set with the new resources or capabilities, the user interface of the primary mobile device 202 may be modified.

FIG. 2B depicts the user interface before modification, where windows 204, 206 and 208 may be displayed on the screen of the primary mobile device 202 and indicate the applications that may be loaded and running on the primary mobile device 202 and using the current resources and capabilities of the aggregate function set, which may be limited to the resources or capabilities of the primary mobile device 202 alone if no other devices have been paired at this point, and then depicts a new window 210 that may be added to the user interface that may represent the resources or capabilities of the new device by adding choices on the screen that a user may select or a display of data that may be gathered from the new device and sent to the primary mobile device 202, and therefore available to the user via the modified user interface.

It should be noted that the example shown in FIG. 2B depicts a window 210 being added to the user interface but one of ordinary skill in the art may recognize that a user interface may be modified in multiple ways, including removing windows from a screen or modifying individual windows to add or remove specific graphics or menu choices. Any method of modifying a user interface such the user interface displays and allows control over the dynamic set of resources or capabilities contained in the aggregate function set is contemplated.

Figure 3:
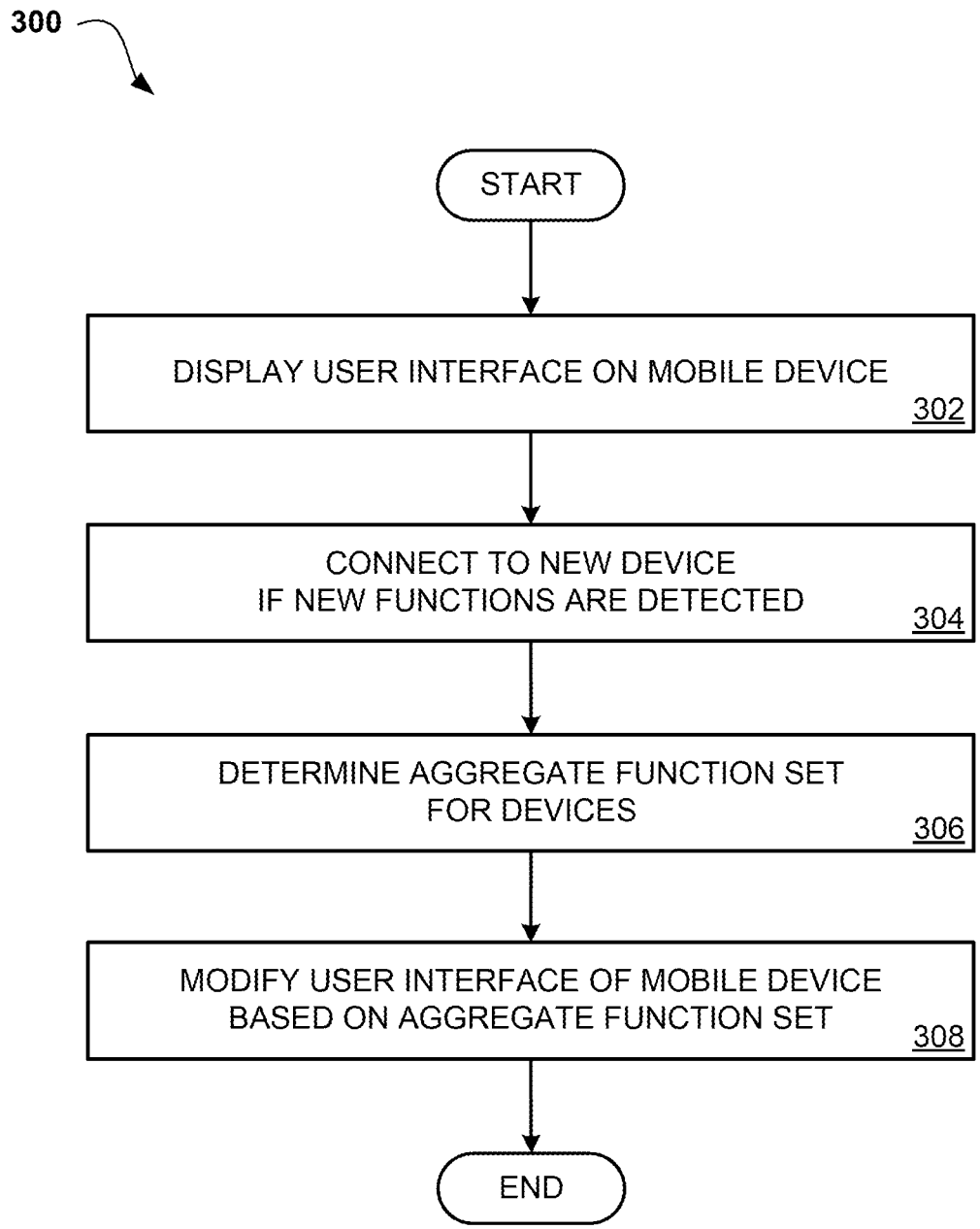
FIG. 3 is a flow chart diagram of a process to dynamically change a user interface on a mobile device based on an aggregate function set of multiple connected devices in accordance with one or more embodiments.

Referring to FIG. 3, an operational flowchart illustrating a process 300 for dynamically changing a user interface on a mobile device based on aggregated capabilities of related mobile devices is depicted according to at least one embodiment. At 302, a user interface may be displayed on a mobile device such as primary mobile device 202. The user interface may be the general user interface loaded and running on the mobile device or may be a separate window that may be generated by an application running on the mobile device. The user interface may include text, as well as various graphics to indicate features or applications that may be loaded and running on the mobile device. As an example, a smartphone or tablet computer may have a recognizable display on its screen that indicates to a user that it is ready and available to accept input from the user, which the user may use to indicate to the device a task that the user wishes to perform with the mobile device.

At 304, it may be determined whether additional resources or capabilities that are not available on primary mobile device 202 are present in a surrounding area. To accomplish this task, the mobile device may scan the surrounding area looking for devices with a specific resource or capability that is needed by the mobile device. In another embodiment, any devices that may be present in a surrounding area may be detected and the resources or capabilities of the detected device may be checked to see if the resources or capabilities of the detected device are both new, i.e., the detected device has resources or capabilities that are not present within the mobile device and needed to accomplish the immediate task. In the event that a device with a desired resource or capability for a specific task is found, or if a resource or capability that is new, e.g., not already found in the primary mobile device 202 or any other connected devices or not present in the aggregate function set described in 306, then the primary device may connect, or pair, with the device. Otherwise, the primary mobile device 202 may ignore the device and continue scanning for devices in the surrounding area.

At 306, an aggregate function set may be determined for a combination of devices including the mobile device and any devices that may be detected and connected to the mobile device. The aggregate function set may be used to track the resources and capabilities that may be available to the mobile device on an ongoing basis. To begin, the aggregate function set may include only the resources and capabilities of primary mobile device 202, but as devices may be detected and resources and capabilities added, these may be added to the aggregate function set such that the mobile device may consider these resources or capabilities as being under the control of the primary mobile device 202. Conversely, if a device is no longer connected to the primary mobile device 202, then the resources or capabilities of the device may also be dropped from the aggregate function set.

At 308, the user interface of the primary mobile device 202 may be changed to reflect the resources or capabilities available within the aggregate function set. For instance, if the primary mobile device 202 is connected to a smart watch and that smart watch includes biometric sensor data for a user, then the aggregate function set may include both the information that biometric sensors are enabled as a resource or capability. As a result, the user interface on the primary mobile device 202 may change to indicate the availability of the biometric sensors of the smart watch and a user may also access the data captured by the biometric sensor through the changed user interface.

Similarly, if the primary mobile device 202 and one or more of the additional devices contributing to the aggregate function set become disconnected, or unpaired, then the resources or capabilities of the primary mobile device 202 may be reduced and the user interface may be updated dynamically to remove the resources or capabilities of the disconnected devices and any functions that may have been enabled as a result of the resources or capabilities of the device. This may mean removing icons from the screen or indicating that a function is not available with a warning or rendering an icon such that it cannot be selected. One of ordinary skill in the art may recognize that there are many ways that an icon or function in a list may be rendered inactive. It should be noted that displaying the inactive icons on the primary mobile device 202 may assist users in determining what devices or resources may be nearby such that the user may select the inactive icon to initiate a search for the corresponding device. A user of the primary mobile device 202 may also use the list of inactive icons to determine a new task that they wish to perform and therefore also initiate a search for the resources or capabilities, and therefore the device that is no longer connected, in order to perform the new task.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
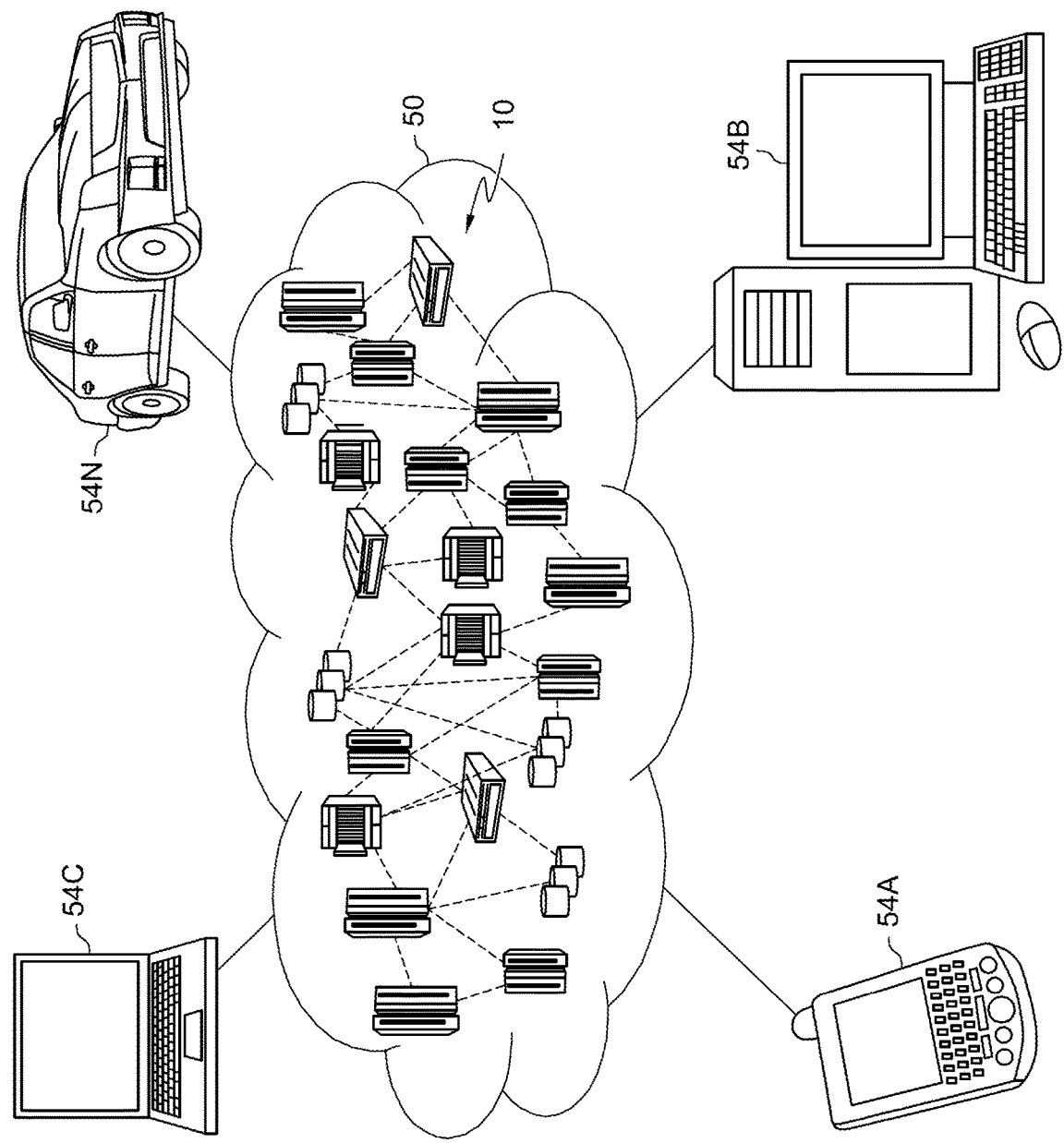
FIG. 4 depicts a cloud computing environment according to an embodiment.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
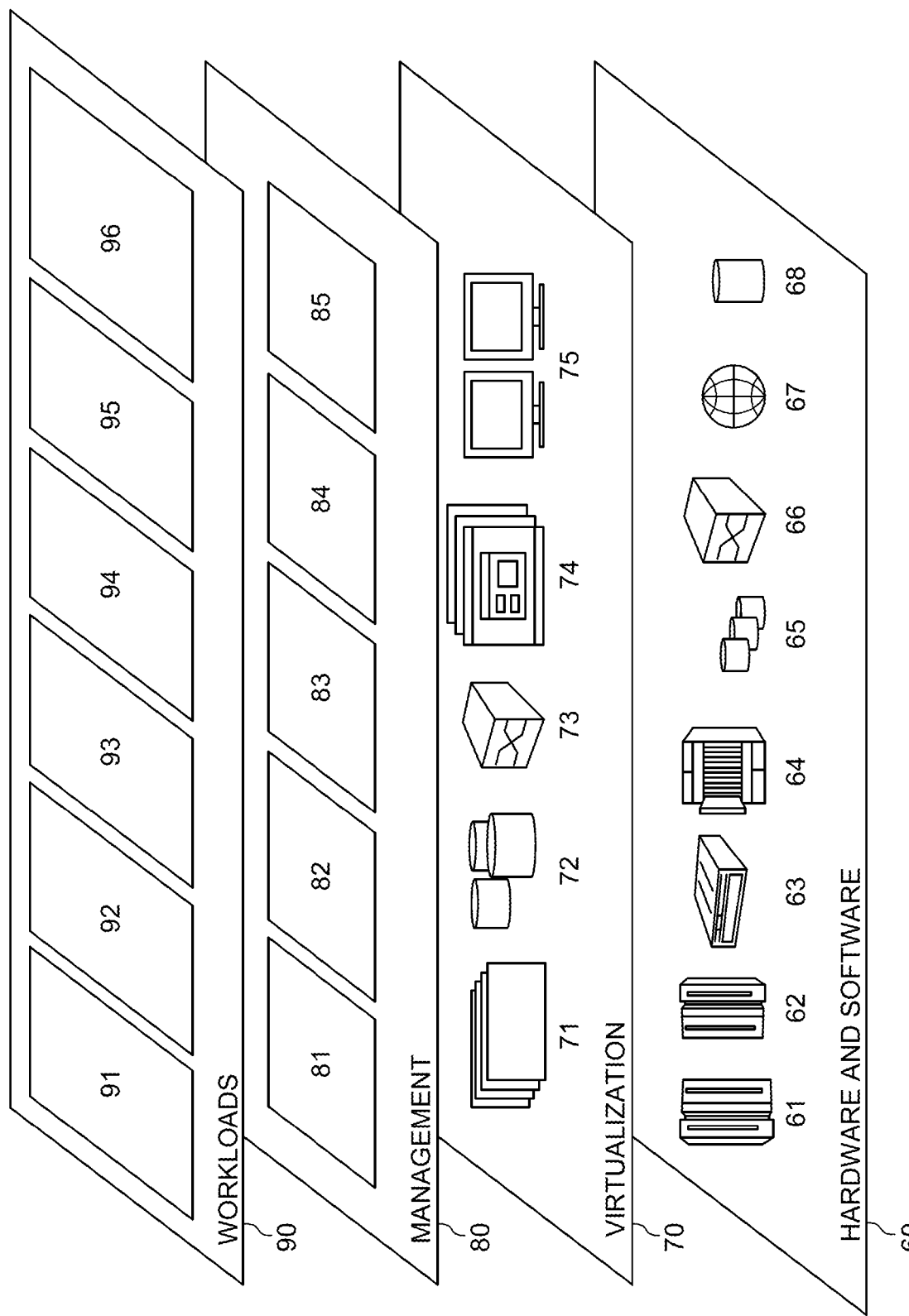
FIG. 5 depicts abstraction model layers according to an embodiment.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and modification of a user interface for a mobile device 96. Modification of a user interface for a mobile device may describe changing a user interface based on an aggregated function set of resources or capabilities of paired mobile devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamically changing a user interface on a mobile device according to aggregate device functionality, the computer-implemented method comprising:
    determining that a task to be performed using the mobile device requires a device capability, wherein the device capability is not included in a plurality of functions of the mobile device;
    identifying the device capability in a second device and establishing a connection between the mobile device and connecting to the second device;
    determining an aggregate function set for the mobile device and the second device, wherein the aggregate function set includes the plurality of functions of the mobile device and the device capability; and
    displaying a user interface on the mobile device for performing the task, wherein the user interface includes a graphical controls corresponding to respective functions in the aggregate function set.

2. The computer-implemented method of claim 1, further comprising:
    in response to the second device disconnecting from the mobile device, updating the aggregate function set by removing the device capability from the aggregate function set; and
    disabling the graphical control corresponding to the device capability.

3. The computer-implemented method of claim 1, further comprising:
    receiving a determination from an owner of the second device that the device capability is allowed; and
    updating the aggregate function set to include the device capability.

4. The computer-implemented method of claim 1, wherein the aggregate function set includes a combined level of computing resources of the mobile device and the second device, wherein the computing resources are selected from a list consisting of: memory, processor speed and available storage space.

5. The computer-implemented method of claim 1, wherein the establishing the connection between the mobile device and the second device further comprises:
    obtaining a user profile, wherein the user profile includes a list of devices allowed to connect to the mobile device; and
    in response to the list of devices including the second device, establishing the connection between the mobile device and the second device.

6. The computer-implemented method of claim 5, further comprising:
    determining a location of the mobile device; and
    updating the list of devices allowed to connect to the mobile device based on the location.

7. The computer-implemented method of claim 1, wherein the establishing the connection between the mobile device and the second device further comprises:
    determining a level of battery power remaining in the second device; and
    in response to the level being above a threshold, establishing the connection between the mobile device and the second device.

8. A computer system for dynamically changing a user interface on a mobile device according to aggregate device functionality, the computer system comprising:
    one or more processors, one or more computer-readable memories, one or more computer-readable storage media, and program instructions stored on at least one of the one or more computer-readable storage media for execution by at least one of the one or more processors via at least one of the one or more memories, wherein the computer system is capable of performing a method comprising:
        determining that a task to be performed using the mobile device requires a device capability, wherein the device capability is not included in a plurality of functions of the mobile device;
        identifying the device capability in a second device and establishing a connection between the mobile device and the second device;
        determining an aggregate function set for the mobile device and the second device, wherein the aggregate function set includes the plurality of functions of the mobile device and the device capability; and
        displaying a user interface on the mobile device for performing the task, wherein the user interface includes graphical controls corresponding to respective functions in the aggregate function set.

9. The computer system of claim 8, further comprising:
in response to the second device disconnecting from the mobile device, updating the aggregate function set by removing the device capability of the second device from the aggregate function set; and
disabling the graphical control corresponding to the device capability.

10. The computer system of claim 8, further comprising:
receiving a determination from an owner of the second device that the device capability device is allowed; and
updating the aggregate function set to include the device capability.

11. The computer system of claim 8, wherein the aggregate function set includes a combined level of computing resources of the mobile device and the second device, wherein the computing resources are selected from a list consisting of: memory, processor speed and available storage space.

12. The computer system of claim 8, wherein the establishing the connection between the mobile device and the second device further comprises:
obtaining a user profile, wherein the user profile includes a list of devices allowed to connect to first mobile device; and
in response to the list of devices including the second device, establishing the connection between the mobile device and the second device.

13. The computer system of claim 12, further comprising:
determining a location of the mobile device; and
updating the list of devices allowed to connect to the mobile device based on the location.

14. The computer system of claim 8, wherein the establishing the connection between the mobile device and the second device further comprises:
determining a level of battery power remaining in the second device; and
in response to the level being above a threshold, establishing the connection between the mobile device and the second device.

15. A computer program product for dynamically changing a user interface on a mobile device according to aggregate device functionality, the computer program product comprising:
a computer-readable storage medium having program instructions embodied therewith, the program instructions executable by a processor to cause the processor to perform a method comprising:
determining that a task to be performed using the mobile device requires a device capability, wherein the device capability is not included in a plurality of functions of the mobile device;
identifying the device capability in a second device and establishing a connection between the mobile device and the second device;
determining an aggregate function set for the mobile device and the second device, wherein the aggregate function set includes the plurality of functions of the mobile device and the device capability; and
displaying a user interface on the mobile device for performing the task, wherein the user interface includes graphical controls corresponding to respective functions in the aggregate function set.

16. The computer program product of claim 15, further comprising:
in response to the second device disconnecting from the mobile device, updating the aggregate function set by removing the device capability from the aggregate function set; and
disabling the graphical control corresponding to the device capability.

17. The computer program product of claim 15, further comprising:
receiving a determination from an owner of the second device that the device capability is allowed; and
updating the aggregate function set to include the device capability.

18. The computer program product of claim 15, wherein the aggregate function set includes a combined level of computing resources of the mobile device and the second device, wherein the computing resources are selected from a list consisting of: memory, processor speed and available storage space.

19. The computer program product of claim 15, wherein the establishing the connection between the mobile device and the second device further comprises:
obtaining a user profile, wherein the user profile includes a list of devices allowed to connect to the mobile device; and
in response to the list of devices including the second device, establishing the connection between the mobile device and the second device.

20. The computer program product of claim 19, further comprising:
determining a location of the mobile device; and
updating the list of devices allowed to connect to the mobile device based on the location.

* * * * *